United States Patent [19]

Inaga

[11] 3,721,776

[45] March 20, 1973

[54] MAGNETIC RECORDING AND/OR REPRODUCING APPARATUS

[75] Inventor: Katsu Inaga, Tokyo, Japan

[73] Assignee: Sony Corporation, Tokyo, Japan

[22] Filed: Aug. 11, 1971

[21] Appl. No.: 170,785

[30] Foreign Application Priority Data

Aug. 11, 1970 Japan ................................45/79882

[52] U.S. Cl. .......................179/100.2 T, 179/100.2 Z

[51] Int. Cl. ................................................G11b 5/52

[58] Field of Search ..................179/100.2 T, 100.2 Z

[56] References Cited

FOREIGN PATENTS OR APPLICATIONS

| | | | |
|---|---|---|---|
| 1,537,240 | 10/1969 | Germany | 179/100.2 T |
| 1,206,606 | 9/1970 | Great Britain | 179/100.2 Z |

*Primary Examiner*—J. Russell Goudeau

*Attorney*—Lewis H. Eslinger

[57] ABSTRACT

A magnetic recording and/or reproducing apparatus of the type having a tape guide drum, at least one rotary magnetic head to scan a tape wrapped on the drum, a stationary magnetic head positioned on a tape path to erase a previously recorded signal from the tape, or to record an information signal on the tape or reproduce previously recorded information, and an automatic tape guide device for automatically threading and wrapping the tape on the guide drum. Such apparatus further includes a movable magnetic shielding means to protect a recorded signal on the tape from undesired magnetic flux produced by the stationary magnetic head. Said movable magnetic shielding means is positioned in front of said stationary magnetic head by the tape guide device carried at a predetermined position to wrap the tape on the guide drum.

14 Claims, 12 Drawing Figures

INVENTOR.
KATSU INAGA
BY Lewis H. Eslinger
ATTORNEY

INVENTOR.
KATSU INAGA
BY Lewis H. Eslinger
ATTORNEY

INVENTOR.
KATSU INAGA
BY
Lewis H Eslinger
ATTORNEY

INVENTOR.
KATSU INAGA
BY Lewis H. Eslinger
ATTORNEY

INVENTOR
KATSU INAGA
BY Lewis H. Eslinger
ATTORNEY

INVENTOR
KATSU INAGA
BY Lewis H. Eslinger
ATTORNEY

INVENTOR.
KATSU INAGA
BY [signature]
ATTORNEY

MAGNETIC RECORDING AND/OR REPRODUCING APPARATUS

BACKGROUND OF THE INVENTION

1. Field of the Invention

This invention relates to a magnetic recording or reproducing apparatus or both and, more particularly, to such apparatus incorporating a magnetic shielding plate for protecting a recorded signal on the magnetic tape from undesired magnetic flux produced by a stationary magnetic head.

2. Description of the Prior Art

Generally, magnetic tape apparatus for recording or reproducing or both comprises one or more rotary magnetic heads operative to record or reproduce signals on a magnetic tape as the latter is wrapped about a guide drum and driven by a capstan and a pinch roller. Such apparatus will be referred to hereinafter simply as magnetic tape apparatus whether it is used for recording or reproducing or both. An important form of such apparatus is the video tape recorder, frequently abbreviated as VTR.

In order to operate a VTR, the tape must be directed or wrapped around the drum for guiding the tape with respect to the rotary magnetic head or heads. Generally, the user must manually thread the tape from a supply reel past various tape guides on the VTR chassis, around the guide drum and from there back to the take-up reel. This operation requires a considerable degree of manual dexterity and can be time consuming. If the tape is not properly threaded, it can jam the mechanism and, if the operator's fingers have any foreign matter thereon, it can be passed to the tape and adversely affect its fidelity.

In order to overcome the aforementioned disadvantages, automatic tape guide devices have been suggested. Generally, such an automatic tape guide device consists of a plurality of movable tape guide pins around the guide drum. The magnetic tape is pulled out by the tape guide pins and then wrapped on the guide drum at a predetermined angle. In a VTR having an automatic guide device, a stationary magnetic head is provided near the guide drum and is positioned on the tape path to record or reproduce an information signal, for example a sound signal or a control signal on the magnetic tape, or to erase a signal recorded on the magnetic tape. Usually, a high-frequency bias signal is supplied to said stationary head during its recording period. Therefore, the video signals recorded on the tape by the rotary head or heads are disturbed by an undesired magnetic flux leaked through the stationary magnetic head.

SUMMARY OF THE INVENTION

In accordance with one aspect of this invention, an automatic tape guide device for a magnetic tape apparatus comprises a rotatable tape guide means having a plurality of tape engaging means spaced around the guide drum. The tape engaging means, in an inactive condition of the apparatus, are displaced out of the guide path to engage the magnetic tape between the supply and take-up reels. Upon turning of the tape guide means, the tape engaging means are moved into the guide path to draw a loop of the tape from the reels and to wrap one side of the loop about the guide drum while the other side of the loop is engaged by the engaging means and maintained in the corresponding guide path spaced from the periphery of the drum. The apparatus further comprises a stationary magnetic head, for example an audio, control, or erase head, which is positioned near the tape guide drum and also is positioned on the tape path, and a movable shield plate to protect a recorded signal on the magnetic tape from an undesired magnetic flux produced by the stationary head or heads.

Accordingly, one object of this invention is to provide a magnetic tape apparatus with improved magnetic shielding means.

Another object of this invention is to provide a magnetic tape apparatus which has an automatic tape guide device and a magnetic shielding plate arranged so that a signal recorded on a magnetic tape will be protected from an undesirable magnetic flux and in which the magnetic shielding plate is positioned in an undesirable magnetic flux generating source in response to the operation of the tape guide device.

Still another object of this invention is to provide a magnetic tape apparatus having a magnetic shielding plate which is inexpensive and easy to handle.

The above, and other objects, features and advantages of the invention, will be apparent from the following detailed description of an illustrative embodiment thereof which is to be read in connection with the accompanying drawings.

DESCRIPTION OF THE PREFERRED EMBODIMENTS

Figure 1:
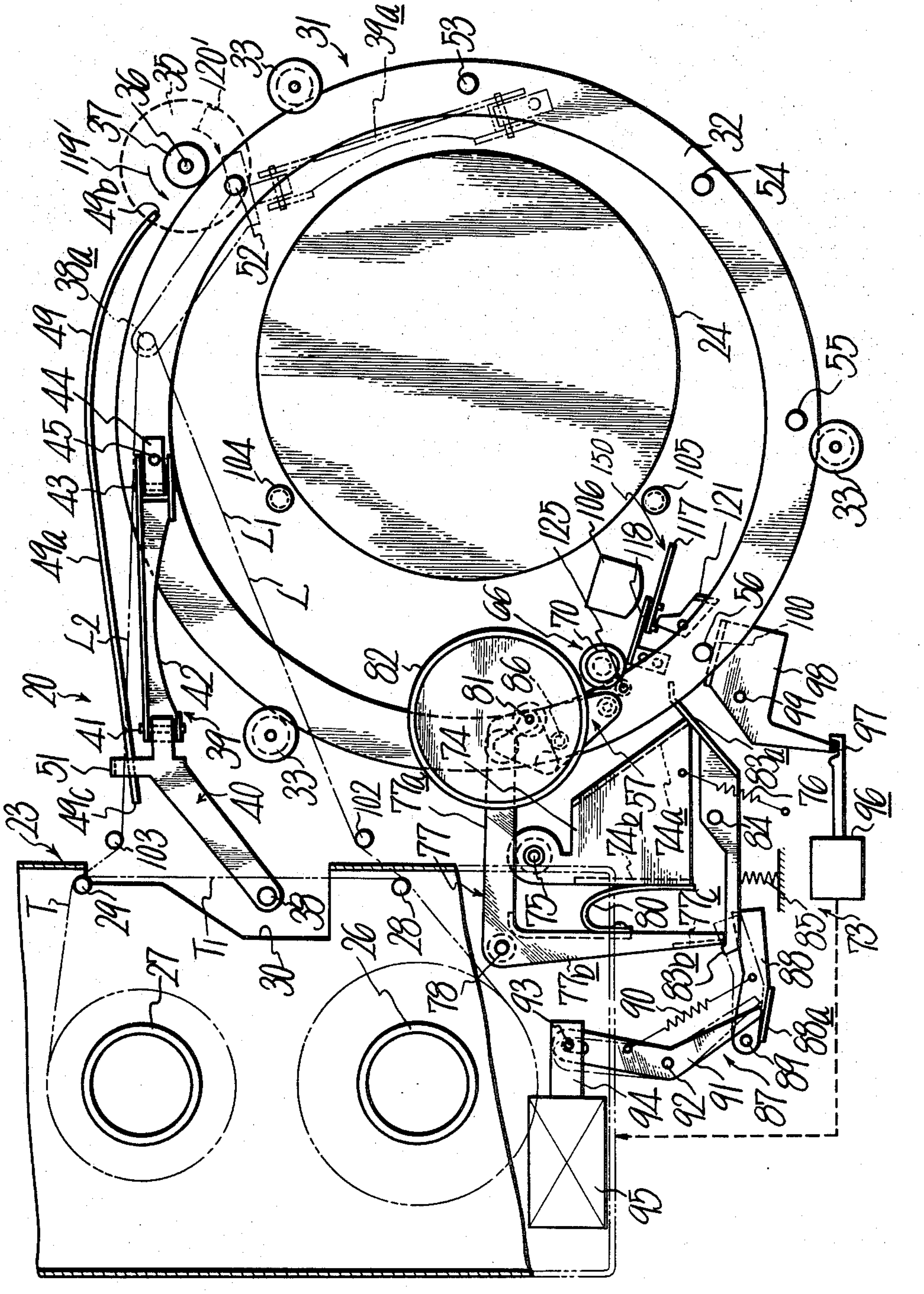
FIG. 1 is a schematic top plan view of an automatic tape guide device according to this invention for a magnetic tape apparatus, and which is shown in full lines in the inactive condition of such apparatus.
Figure 2:
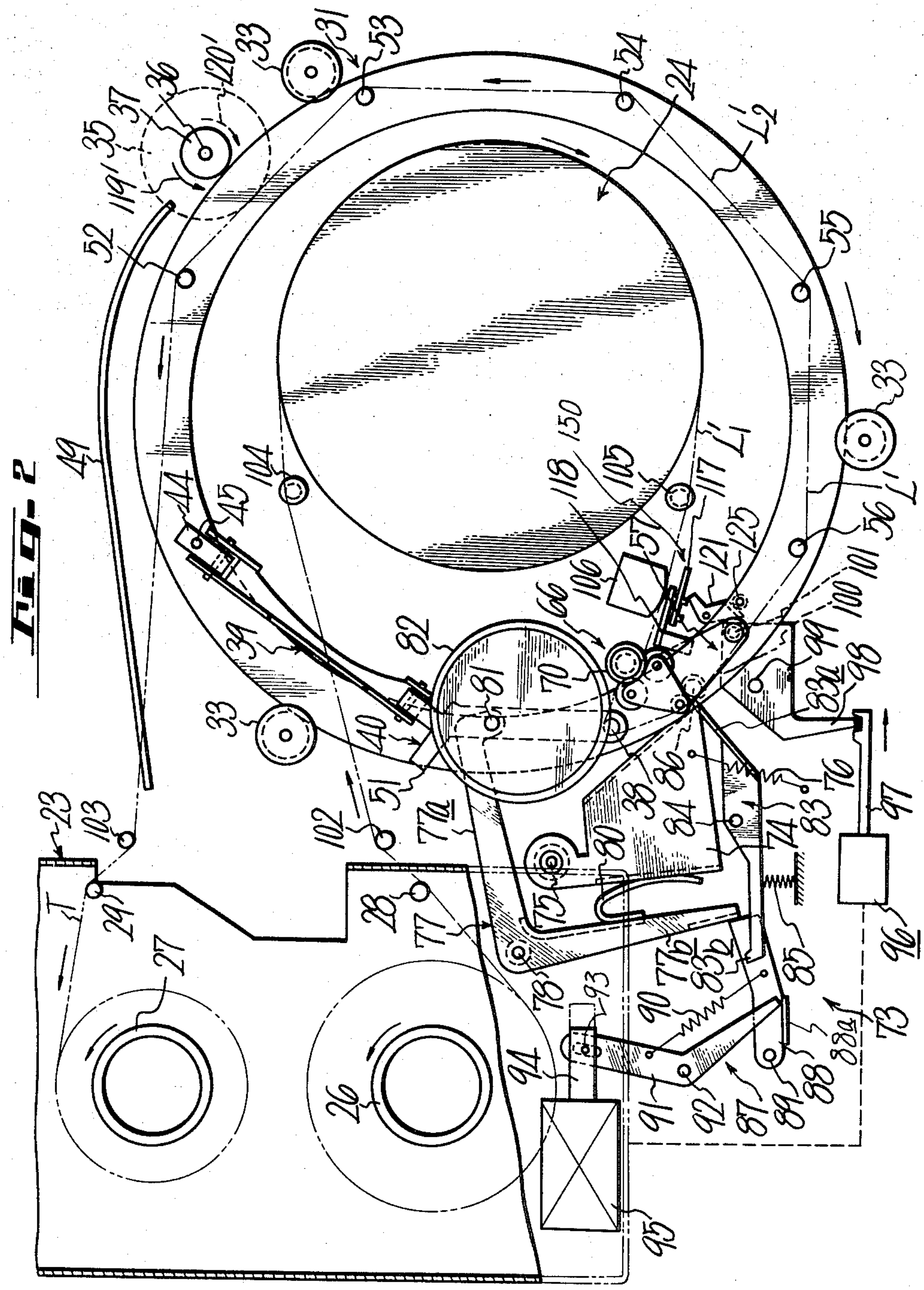
FIG. 2 is a view similar to that of FIG. 1, but showing the tape guide device in the operative condition of the apparatus.
Figure 3:
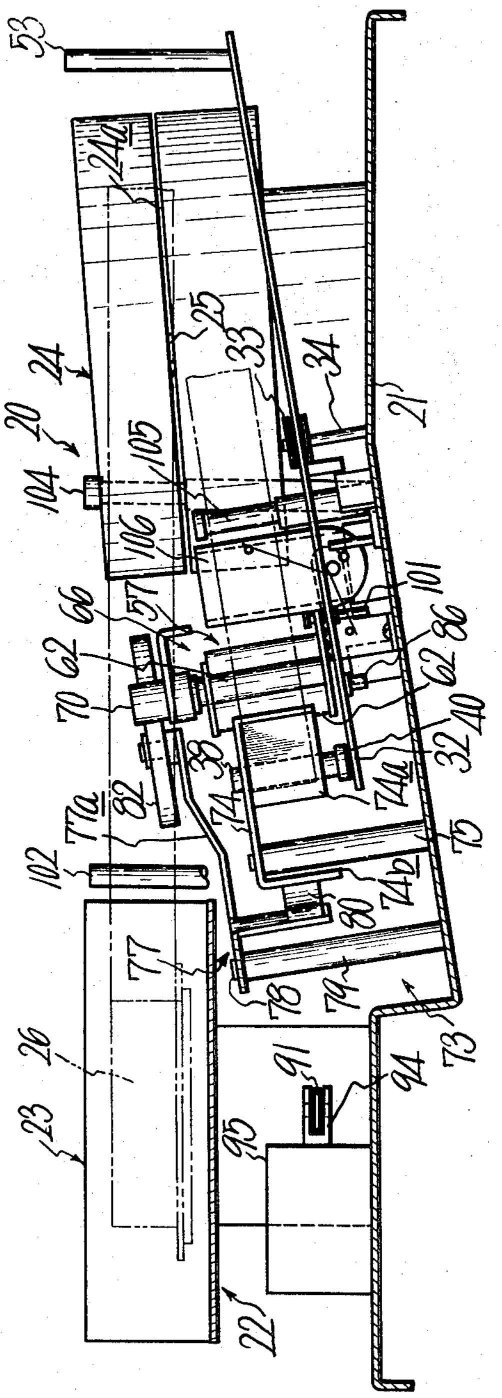
FIG. 3 is a schematic side elevational view of the apparatus in the operative condition thereof indicated in FIG. 2.

Referring to the drawings in detail, and initially to FIGS. 1, 2, and 3 thereof, it will be seen that an automatic tape guide device according to an embodiment of this invention is shown for use in a cassette-type VTR, but it should be understood that the invention is equally applicable to any other magnetic tape apparatus in which the magnetic tape is carried by supply and take-up reels, and it is necessary to draw the tape from between such reels and to wrap the tape about a guide drum having a magnetic head or heads associated therewith for scanning the tape guided by the drum.

The cassette-type VTR shown in the drawings is generally identified by the reference numeral 20 and comprises a chassis 21 having a cassette holder 22, which is indicated schematically in FIG. 3 and hereinafter described in detail, mounted above the forward portion of the chassis 21 to receive and support a cassette 23 containing a supply of magnetic tape. The apparatus 20 also comprises a tape guide drum 24 suitably mounted above the back portion of the chassis 21 and defining a circumferential slot **24*a* (FIG. 3) in which one or more rotary magnetic heads 25 are exposed to scan the magnetic tape when the latter is wrapped about a predetermined part of the periphery of the drum 24**.

The magnetic tape T is shown to be wound on a supply reel 26 and a take-up reel 27 which are rotatable within the cassette 23, and the tape T extends over guide pins 28 and 29 located at opposite ends of an opening 30 at the back portion of the cassette 23 so that a run $T_1$ of the tape extending between the reels 26 and 27 will be exposed at the cassette opening 30, as shown in FIG. 1.

The automatic tape guide device 31 comprises a support member 32, which, in this embodiment, is in the form of a circular ring that extends around the drum 24. The ring 32 is supported for rotation about its center by a number of grooved rollers or pulleys 33 that engage the periphery of the ring 32 at spaced locations. The pulleys 33 are rotatably supported on posts 34 (FIG. 3) extending upwardly from the chassis 21. Preferably, as shown in FIG. 3, the support ring 32 is mounted so that its plane of rotation slopes downwardly in the forward direction below the plane of rotation of the reels 26 and 27. Further, as shown, the drum 24 is also preferably mounted so that the plane of rotation of the magnetic head or heads 25 is circumferential and the slot **24*a* is below the level of the reels 26 and 27 in the cassette. The plane of rotation of the heads 25 also slopes downwardly in the forward direction so as to substantially bisect the angle included between the plane of rotation of the reels and the plane of rotation of the support ring 32. As is shown particularly in FIG. 1, the cassette 23 is preferably laterally offset with respect to the axis of the drum 24, and the ring 32 is eccentrically located with respect to the drum 24 so that the center of rotation of the ring 32 is displaced forwardly, that is, in the direction toward the cassette 23, from the axis of the drum 24**.

The support ring 32 is turned by a reversible DC electric motor 35 shown in broken lines in FIGS. 1 and 2. This motor is suitably mounted on the underside of the chassis 21 and has its shaft 36 extending upwardly through an opening in the chassis adjacent the periphery of the ring 32. The shaft carries a rubber-surfaced drive roller 37 that frictionally engages the periphery of the ring. By suitable control of the motor 35, as hereinafter described in detail, the support ring 32 can be turned in the clockwise, or tape guiding, direction from its inactive position shown in FIG. 1 to its operative position shown in FIG. 2, and for unloading the tape, the ring 32 can be turned in the counterclockwise direction from its operative position shown in FIG. 2 to its initial, or inactive, position shown in FIG. 1.

A tape engaging member 38, which is preferably in the form of an upstanding, rotatable flanged pin or roller, is mounted, by an arm assembly 39, on the support ring 32 so as to move with the latter during turning of the support ring. At the same time, the assembly 39 is movable relative to the ring 32, both in the direction generally toward and in the direction away from the center of rotation of the ring, as well as in the direction generally perpendicular to the plane of rotation of the ring 32. The arm assembly 39 includes a bracket 40 and an arm 42 that extend generally parallel to the plane of rotation of the ring 32, and the bracket 40 has the tape-engaging member 38 extending upwardly from its free end portion, and the other end of the bracket 40 s pivotally mounted by a pin 41 on one end of the arm 42 so that the bracket 40 can swing vertically. The other end of the arm 42 is pivotally mounted by a pin 43 on a bracket 44. The bracket 44 is pivotally mounted on a pivot 45 carried by the support ring 32 and extending generally perpendicular to the plane of rotation of the latter. It will be apparent that swinging of the arm 42 about the pivot pin 43 permits upward and downward movement of the tape engaging member 38 in directions generally perpendicular to the plane of rotation of the ring 32. The tape engaging member 38 remains substantially erect during such movement; whereas, swinging of the bracket 44 about the pivot 45 permits movement of the tape engaging member 38 outwardly away from the ring 32, either outwardly to the position shown in FIG. 1, or inwardly to a position above the ring 32, as shown in FIG. 2.

In order to dispose the tape engaging member 38 in the position shown in FIG. 1 when the ring 32 is in its inactive position so as to raise the arm assembly 39 and swing the latter outwardly relative to the ring 32, the tape guide device 31 also includes an arcuate cam plate 49 mounted on the chassis 21. This cam plate extends alongside a portion of the cam ring 32 and diverges forwardly from the latter to adjacent the cassette 23. A bent tab 51 extends outwardly and then downwardly from the bracket 40 and slidably engages the top edge **49*a* of the cam plate 49 to act as a cam follower. The edge 49*a* of the cam plate 49 is shaped to extend upwardly with respect to the plane of rotation of the ring 32 in the direction from the end 49*b* of the cam plate 49, which is remote from the cassette 23, to the end 49*c* of the cam plate adjacent the cassette. Thus, when the ring 32 turns counterclockwise from the position shown in FIG. 2 to the inactive position shown in FIG. 1, the bent tab 51 acting as a cam follower comes into engagement with the top edge 49*a* of the cam plate 49 at the end 49*b* thereof and thereafter moves along the edge 49*a* toward the end 49*c*. This raises the arm aslocated to engage the end portion 83***a* of the latch lever 83 to rock the latter in the counterclockwise direction and thereby release its keeper 83*b* from the bell crank 77 when the ring 32 moves to its operative position as shown in FIG. 2.

When the keeper 83*b* of the latch lever 83 is thus released from the bell crank 77, the action of the spring 76 on the pressing member 74 is transmitted through the spring 80 to the bell crank 77 to rock the latter further in the clockwise direction and thereby to bring the wheel 82 against the rotated roller 70. Thus, the wheel 82 is turned by the roller 70 and, in the course of such turning, presents peripheral portions to the roller 70 which are at progressively increasing distances from the axis of rotation of the axle 81 and the wheel 82, whereby such axis of rotation is moved away from the roller 70 and the bell crank 77 is rocked in the counterclockwise direction to the position shown in FIG. 2. The described rocking of the bell crank 77 is transmitted through the spring 80 to the pressing member 74 to press the flange 74*a* thereof against the bearing roller 62 and thereby urge the pinch rollers 60*a* and 60*b* against the capstan 67.

In order to maintain the pinch rollers 60*a* and 60*b* against the capstan 67 to drive the tape during operation of the apparatus 20 for recording or reproducing signals on the tape T, the assembly 73 also comprises a second latching device 87 that includes a latch lever 88 pivoted on a pin 89 at one end and urged by a spring 90 to the position shown in FIG. 2 in which the free end of the lever 88 blocks the return clockwise rocking of the bell crank 77. The latching device 87 further includes a release lever 91 pivoted intermediate its ends on a pin 92. One end of the lever 91 is engageable against a flange 88a on the latch lever 88 with the other end connected, as by a pin and slot connection 93, with the armature 94 of a solenoid 95. The armature 94 is urged, as by a spring (not shown), to its extended position shown in FIG. 1 so that the release lever 91 depresses the latch lever 88 to the position shown in full lines in FIG. 1 where it is free of the bell crank 77. However, when the solenoid 95 is energized, the armature 94 is retracted, as shown in full lines in FIG. 2, to permit the spring 90 to elevate the latch lever 88 and engage the free end of the latter with the bell crank 77 after the latter has been rocked in response to turning of the wheel 82, as described above.

Figures 4, 5, 6:
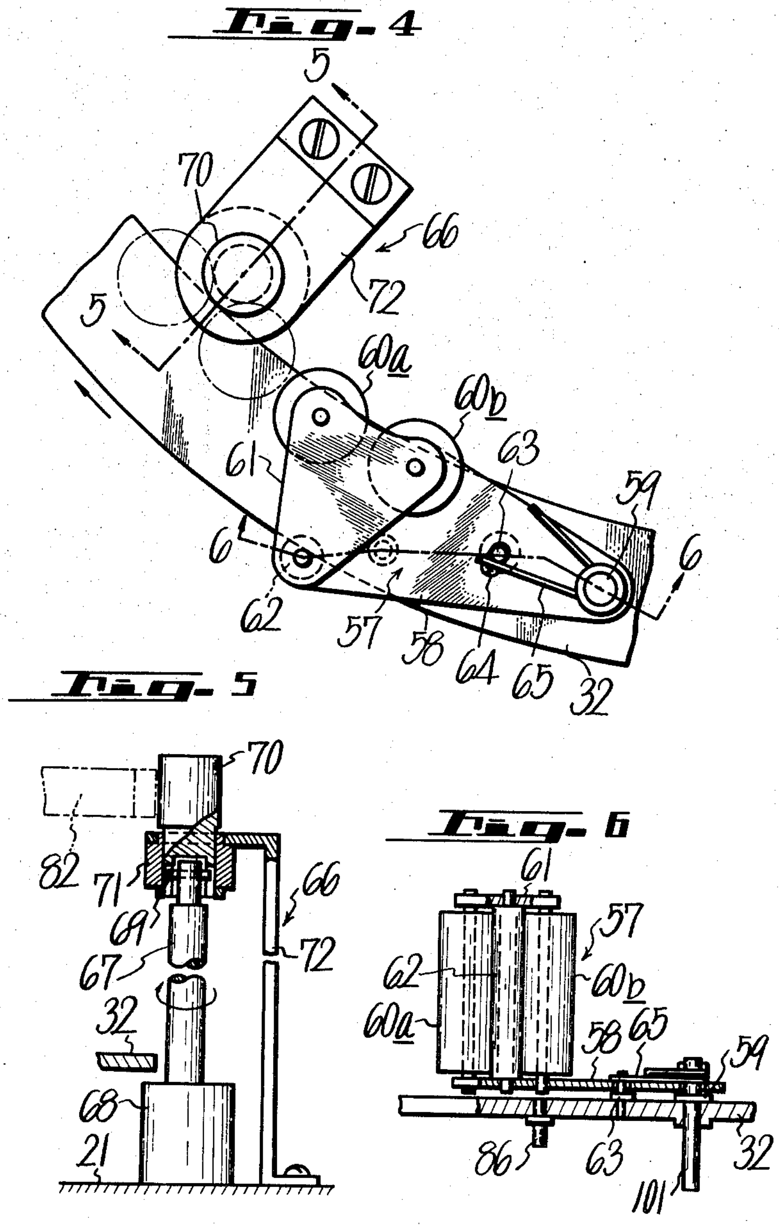
FIG. 4 is a fragmentary enlarged plan view showing the arrangement of a capstan and a pinch roller assembly in the apparatus having a tape guide device according to this invention.
FIG. 5 is a sectional view taken along the line 5—5 in FIG. 4.
FIG. 6 is a sectional view taken along the line 6—6 in FIG. 4.

The energizing of the solenoid 95 is controlled by a normally open switch 96 which is closed to energize the solenoid when a switch actuator 97 is displaced toward the right from the position shown in FIG. 1. Such displacement of the switch actuator 97 is effected by a lever 98 engaged therewith and pivotally mounted on a pin 99 so as to extend under the path of the ring 32 where a flange 100 on the lever 98 is engageable by a pin 101 (FIG. 6) which may be a downward extension of the pivot pin 59. Thus, when the ring 32 moves to its operative position shown in FIG. 2, the pin 101 engages the flange 100 to rock the lever 98 from the position of FIG. 1 to the position of FIG. 2, and the switch actuator 97 is displaced to close the switch 96 and thereby cause energization of the solenoid 95.

In order to further guide the tape withdrawn from the cassette 23, the apparatus 20 has fixed guide pins 102 and 103 disposed in back of the location of the cassette 23 when the latter is supported on the holder 22 and located adjacent the guide pins 28 and 29, respectively, of the cassette. Further, a fixed guide pin 104 is disposed adjacent the drum 24 approximately on a line extending tangentially from the guide pin 102 to the surface of the drum 24, and a guide pin 105 is disposed adjacent the drum 24 approximately on a line extending tangentially between the drum 24 and the capstan 67. As is particularly apparent in FIG. 3, the guide pin 104 is substantially erect and is at a level that corresponds to that of the tape being withdrawn from the cassette 23, and the guide pin 105 is inclined from the vertical so as to be substantially perpendicular to the plane of rotation of the ring 32 and is at a level substantially lower than that of the guide pin 104 for engagement with the tape run extending from the surface of the drum 24 to the tape engaging member 38 when the ring 32 is in its operative position indicated in FIGS. 2 and 3.

A stationary magnetic recording and/or reproducing head 106 is mounted on the chassis 21 between the capstan assembly 66 and the guide pin 105 so as to be engaged by the tape when the ring 32 is in its operative position, and such magnetic head 106 may be employed for recording and/or reproducing audio and/or control signals on the tape, whereas the rotary head or heads 25 may be used for recording and/or reproducing video signals in skewed tracks extending obliquely across the tape. The above-described tape guide device 31 operates as follows:

With the ring 32 initially in its inactive position shown in FIG. 1, and a cassette 23 located at a predetermined position, the tape engaging member 38 extends upwardly into the opening 30 at the back of the cassette and engages in front of the tape run $T_1$ exposed at such opening. Upon closing of "play" switch (not shown), current is made to flow from a source to the motor 35. The motor 35 is driven in the direction of the arrow 119' in FIG. 1 to cause clockwise rotation of the ring 32. During the initial portion of such clockwise rotation of the ring 32 away from its inactive position, the tape engaging member 38 is moved with the support ring, for example, to the position shown in broken lines at 38*a* in FIG. 1, and withdraws tape from the cassette to form a tape loop L. By reason of the coaction of the cam plate 49 and the bent tab 51 acting as a cam follower, during the initial movement of the ring 32 from its inactive position, the arm assembly 39 is brought to a position approximately superposed on the ring 32, as indicated in broken lines at 39*a* in FIG. 1. It will be seen that the tape loop L thus formed includes a side or run $L_1$ extending between the tape engaging member 38 and the guide pin 102 and facing toward the drum 24 and a side or run $L_2$ extending between the tape engaging member 38 and the guide pin 103 and facing away from the guide drum. During the initial clockwise turning of the support ring 32, the pinch roller assembly 57 and the adjacent guide pin 56 move into the loop L between the runs $L_1$ and $L_2$ thereof and, as clockwise rotation of the ring 32 is continued, for example, to the operative position shown in FIG. 2, the tape loop is progressively lengthened, for example as indicated at L' in FIG. 2, and the other guide pins 55, 54, 53 and 52 move successively into such enlarged loop. The movement of the pinch roller assembly 57 sembly 39 and swings it outwardly away from the ring 32. When the ring 32 is in its inactive position, shown in FIG. 1, the cam plate 49 positions the arm assembly 39 so that the tape engaging member 38 carried by the latter extends upwardly into the opening 30. In this position the member 38 is in front of the run $T_1$ of the tape that extends between the guide pins 28 and 29 and is exposed at the cassette opening. Of course, it is intended that the tape engaging member 38 should be in this raised position shown in FIG. 1 prior to the positioning of the cassette 23 on the holder 22 at the level indicated in FIG. 3. It is also intended that the cassette 23 should be moved downwardly to the level shown in FIG. 3, for example by the operation of the holder 22, whereby the downward movement of the cassette results in the entry of the tape engaging member 38 into the cassette opening 30.

The support ring 32 also carries a series of guide pins 52, 53, 54, 55, and 56 that extend upwardly from the ring at locations spaced apart along approximately the half of the ring 32 that is diametrically opposed to the portion of the ring along which the arm assembly 39 extends when it is in overlying relation to the ring as shown in FIG. 2. The guide pins 52–56 define a guide path spaced from the periphery of the drum 24 and are located where they can be engaged by the tape, as hereinafter described, when the device 31 is operated to wrap a portion of the tape on a predetermined peripheral part of the drum 24.

Also mounted on the support ring 32 between the guide pin 56 and the location of the tape engaging member 38 when the latter is disposed above the ring 32, as in FIG. 2, is a pinch roller assembly 57 (FIGS. 1–3, 4 and 6). As shown particularly in FIGS. 4 and 6, the pinch roller assembly 57 may include a lever arm 58 pivoted at one end on a pivot pin 59 carried by the ring 32. The other end portion of the arm 58 supports the lower ends of upstanding pinch rollers **60*a* and 60*b* which face toward the inside of the ring 32 and have their upper ends joined by a cross plate 61. Disposed outwardly with respect to the pinch rollers 60*a* and 60*b* is a bearing roller 62 the upper and lower ends of which are secured to the cross plate 61 and the lever arm 58. Swinging of the lever arm 58 relative to the ring 32 is limited by a pin 63 fixed to the ring 32 and engaging in a laterally elongated slot 64 formed in the lever arm 58. The lever arm 58 is yieldably urged outwardly with respect to the ring 32 to the limit of such outward movement permitted by the coaction of the pin 63 and the slot 64, for example as by a torsion spring 65 that extends around the pivot pin 59 and has its opposite end portions bearing against an edge of the lever arm 58 and the pin 63**.

A capstan assembly 66 (FIGS. 1–3 and 5) is disposed inside the circular path of travel of the ring 32 and located so that the pinch rollers **60*a* and 60*b* will be adjacent this assembly when the ring 32 is turned to its operative position (FIG. 2). As shown particularly in FIG. 5, the capstan assembly 66 includes a capstan 67 journalled in a bearing 68 mounted on the chassis 21 and arranged to be rotated by a motor (not shown) disposed underneath the chassis. The upper end of the capstan 67 is rotatably coupled, as by a coupling 69, with a drive roller 70 that has a grooved surface and is journalled in a bearing 71 supported by a bracket 72 that extends upwardly from the chassis 21**.

The illustrated tape guide device 31 further comprises a pressing assembly 73 (FIGS. 1, 2 and 3) which, as is hereinafter described in detail, is operative to press the pinch rollers **60*a* and 60*b* against the capstan 67 with the tape between the capstan and the rollers upon the attainment by the ring 32 of its operative position shown in FIG. 2. The assembly 73 is shown to include a pressing member 74 located outside of the path of travel of the ring 32 and pivotally mounted on a pin 75 carried by the chassis 21 (FIG. 3) for swinging toward and away from the ring 32. At its side facing toward the ring 32, the pressing member 74 has a flange 74*a* which, when the ring 32 is in its operative position (FIG. 2) and the pressing member 74 is rocked in the direction toward the ring 32, engages the bearing roller 62 of the pinch roller assembly 57 to rock the lever arm 58 against the force of the spring 65 and thereby move the pinch rollers 60*a* and 60*b* against the capstan 67. A spring 76 is connected to the pressing member 74 to urge the latter to the position shown in FIG. 1 where its flange 74*a* is spaced from the path of travel of the pinch roller assembly 57 with the ring 32. A bell crank 77 is pivotally mounted, intermediate its right angled arms 77*a* and 77*b*, on a pivot pin 78 carried by a post 79 (FIG. 3) extending upwardly from the chassis 21. A leaf spring 80 extends from the bell crank arm 77*b* and is engageable with a flange 74*b* formed on the side portion of the pressing member 74 facing away from the ring 32 so that, when the bell crank 77 is rocked in the counterclockwise direction, for example from the position shown in FIG. 1 to the position shown in FIG. 2, the leaf spring 80 acts on the flange 74*b* of the pressing member 74 to pivot the latter toward the ring 32 against the force of the spring 76. The other arm 77*a* of the bell crank 77 extends above the path of the ring 32 and, at its free end, supports an axle 81 on which a rubber tired wheel 82 is eccentrically rotatable at the level of the grooved drive roller 70 which is coupled with the capstan 67 (FIG. 3). By reason of its eccentric mounting, the wheel 82 has diametrically opposed peripheral portions which are respectively at maximum and minimum distances from its axis of rotation and peripheral portions therebetween of progressively decreasing distances from the axis of rotation defined by the axle 81**.

The assembly 73 also includes a first latch device 83 in the form of a latch lever which is pivoted intermediate its ends on a pin 84 and which is urged by a spring 85 to rock in the clockwise direction to the position shown in FIG. 1. In this position, and end portion **83*a* of the latch lever 83 extends under the ring 32, and a keeper 83*b* at the opposite end of the latch lever 83 is engaged with a flange 77*c* that extends downwardly from the free end of the bell crank arm 77*b* and limits the rocking of the bell crank 77 in the clockwise direction to the position shown in FIG. 1. With the bell crank 77 in this position and limited by the engagement of the latch lever 83 therewith, the distance from the axis of rotation of the eccentric drive wheel 82 to the surface of the grooved drive roller 70 is slightly greater than the minimum distance from the axis of rotation of the drive wheel 82 to the periphery of the latter, and hence the wheel 82 is spaced from, and not rotated by, the roller 70. In order to release the latch lever 83, an abutment or pin 86 (FIGS. 1, 2 and 6) depends from the ring 32 under the pinch roller assembly 57** and is and the successive guide pins 56–52 into the progressively enlarging loop under the tape run extending between guide pins 102 and 104 is made possible by the described slanting plane of rotation of the support ring 32 which results in the ring 32 and the elements carried thereby being at a relatively low level at the portion of the ring between the drum 24 and the cassette 23.

During the described clockwise rotation of the ring 32 to the operative position shown in FIG. 2, the side $L'_1$ of the progressively enlarged loop L' is wrapped about a substantial peripheral extent of the drum 24 and the run of that side of the loop extending from the drum 24 to the tape engaging member 38 is brought adjacent the capstan 67 and the fixed magnetic head 106, as shown in FIG. 2. Further, as the tape loop is progressively lengthened, the other side $L'_2$ thereof, which extends from the tape engaging member 38 to the guide pin 103, is engaged by the guide pins 52–56 on the ring 32, and such guide pins 52–56 define a guide path for holding the side $L'_2$ of the lengthened loop away from the surface of the drum 24.

When the ring 32 reaches the position shown in FIG. 2, as previously described, the movement of the ring 32 to its operative position causes release of the latch lever 83 and also the closing of the switch (not shown) so that the pressing assembly 73 is operated to press the pinch rollers 60*a* and 60*b* against the capstan 67 with the tape therebetween for driving the tape in the direction of the arrow 125 in FIG. 2. So long as the solenoid 95 remains energized by the closing of said switch, the latch device 87 is effective to cause the pressing assembly 73 to maintain the pinch rollers 60*a* and 60*b* against the capstan 67 so that the tape is continuously driven in the direction of the arrow 125 for unwinding from the supply reel 26 and rewinding on the take-up reel 27. Under such conditions, a video signal is recorded on or reproduced from the tape T by the rotary magnetic head or heads 25 and, at the same time, audio and control signals are recorded on or reproduced from the tape T by the stationary head 106.

Upon completion of the recording or reproducing, a "stop" switch (not shown) is actuated. The opening of the switch (not shown) deenergizes the solenoid 95 to release the latch device 87 to permit the wheel 82 to again engage the drive roller 70 so that the wheel 82 is turned from the position in FIG. 2 to the position in FIG. 1. The consequent rocking of the bell crank 77 permits the pressing member 74 to move away from the pinch roller assembly 57 and thereby free the pinch rollers 60*a* and 60*b* from the capstan 67. And also, the opening of the switch completes an energizing circuit for the motor 35 from the source through the motor 35. Thus, simultaneously with the release of the latch device 87 and the consequent removal from the pinch roller assembly 57 of the force urging the pinch rollers against the capstan 67, the ring 32 is turned in the counterclockwise direction from the position shown in FIG. 2 and the pin 86 moves away from the end portion 83*a* of the latch lever 83 to permit the keeper 83*b* to engage the bell crank 77 again to hold the latter in the position shown in FIG. 1. During such counterclockwise turning of the ring 32, the take-up reel 27 is conventionally driven in the direction for rewinding the tape thereon so that, as the ring 32 turns from the position shown in FIG. 2 to the inactive position shown in FIG. 1, the tape loop L is progressively reduced in size until such loop completely disappears and the tape run $T_1$ again extends between the guide pins 28 and 29 of the cassette 23.

The tape guide device described above facilitates loading of the tape around the tape guide drum. However, the side L' of the tape loop formed between the tape engaging member 38 and the guide pin 103 extends near the stationary magnetic head 106 between the tape engaging member and the guide pin 56, so that signals previously recorded on the tape T are either disturbed by a magnetic flux leaking from the stationary magnetic head 106 or the magnetic flux is recorded as a noise signal on the tape T.

To avoid this, the present invention employs a magnetic shielding means 150, which is disposed in adjacent but spaced relation to the stationary magnetic head 106 so as to prevent deterioration of the recording and reproducing characteristics caused by the so-called stray magnetic flux. Needless to say, in the loading or unloading of the tape T the magnetic shielding means 150 must be shifted from the front of the stationary magnetic head 106 so as not to hinder the tape loading or unloading.

The following describes a preferred embodiment of the magnetic shielding means 150 employed in the present invention.

Figure 7:
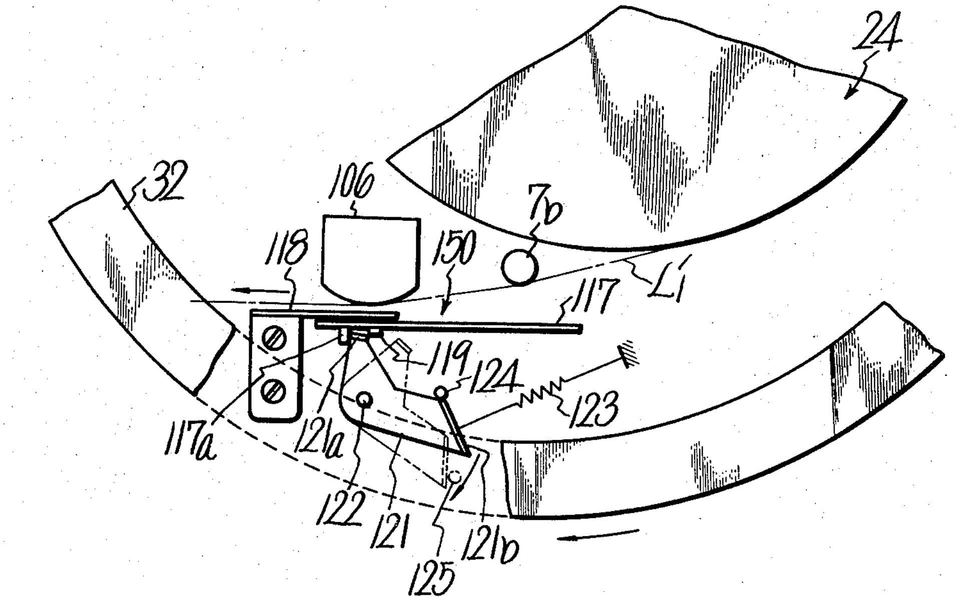
FIG. 7 is a top plan view of a magnetic shielding assembly included in the magnetic tape apparatus according to this invention.
Figure 8:
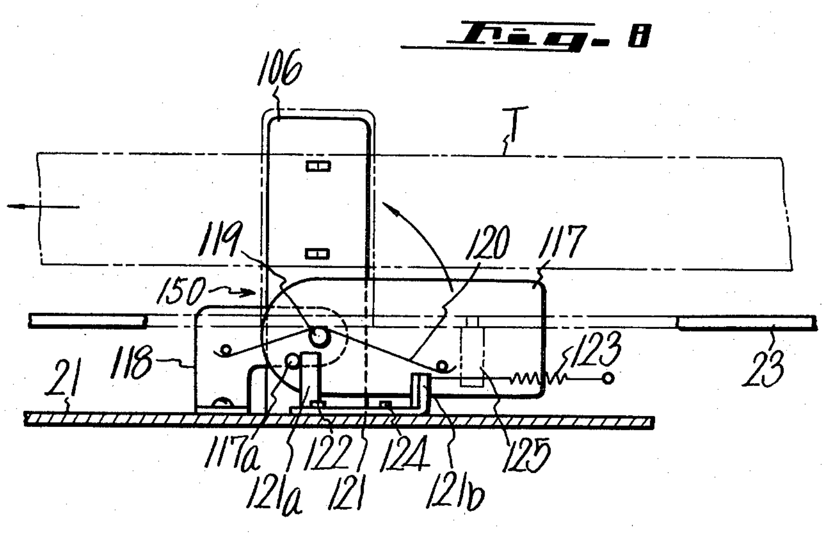
FIG. 8 is a side elevational view of the magnetic shielding assembly.

In FIGS. 7 and 8 a substantially L-shaped angled bracket 118 such as illustrated is mounted on the chassis 21 and a shield plate 117 of a suitable magnetic shielding material, such as permalloy, is pivoted at its lower end to the free end portion of the bracket 118 by means of a pin 119. A hair spring 120 is mounted on the projection of the pin 119 to bias the shield plate 117 and move it with a rotary plate 121.

The rotary plate 121 is, for example, substantially L-shaped and is pivoted on a pin 122 at its bent portion on the chassis 21. One arm of the rotary plate 121 is gradually tapered but extends adjacent to the lower end of the shield plate 117 and has a bent tab 121*a* extending upwardly from the tapered end. The bent tab 121*a* engages with a pin 117*a* on the left thereof, which is affixed to the shield plate 117 below the pin 119. That is, in FIGS. 7 and 8 the shield plate 119 is shown to be brought down to right about 90° and retained by the bent tab 121*a* against the biasing force of the spring 120.

The other arm of the rotary plate 121 is made gradually wider toward its end and has a lug 121*b* underlying the ring 32 and extending upwardly from the end portion. The rotary plate 121 is pulled counterclockwise by a spring 123 to impart force to the rotary plate 121 to retain the shield plate 117 in its inactive position as above described. Reference numeral 124 designates a stopper for the rotary plate 121.

A pressing member 125 for pressing the lug 121*b* of the rotary plate 121 is mounted on the underside of the ring 32 at a predetermined position, by which, in the final stage of the tape loading above described, the rotary plate 121 is turned clockwise to permit the shield plate 117 to rise up to its upstanding position in front of the stationary head 106 shown in chain line.

In the illustrated example, the shield plate 117 is normally held in its inactive position, and, immediately after the magnetic tape T is brought into contact with the stationary head 106 by the aforementioned tape loading operation, the shield plate 117 is brought up to its upstanding or active position. Immediately before unloading of the tape T, the shield plate 117 is again brought down to its inactive position. The actuation of the shield plate 117 is achieved by suitable selection of the pressing member 125.

The mechanism described herein is intended as being illustrative and not as limiting the invention specifically thereto. Of course, the shield plate 117 may be turned down to left and the driving means therefor may be variously modified.

In the case of VTR's, such as the type exemplified herein, the shield plate 117 can be turned up in response to engagement of the magnetic tape T with the stationary head 106 by an associated mechanism made up of the rotary plate 121 and so on utilizing the rotational movement of the ring 32, which serves as a tape guide means. Conversely, the shield plate 117 can be turned down in response to disengagement of the tape T from the head 106.

It will readily be understood that, in the present example, a second stationary magnetic head, such as an erasing head, may be located between the supply reel 26 and the drum 24, in which case a shielding means is positioned in front of the second magnetic head.

Figure 10:
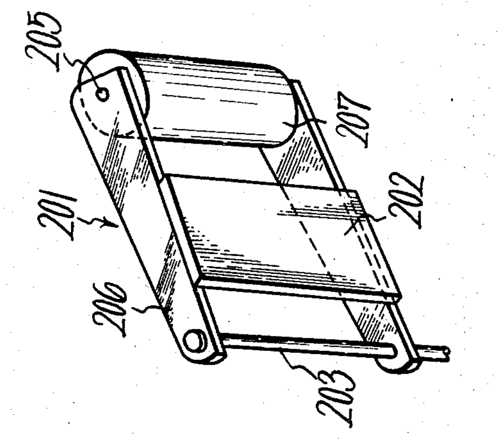
FIG. 10 is a perspective view of the pinch roller assembly illustrated in FIG. 9.
Figure 9:
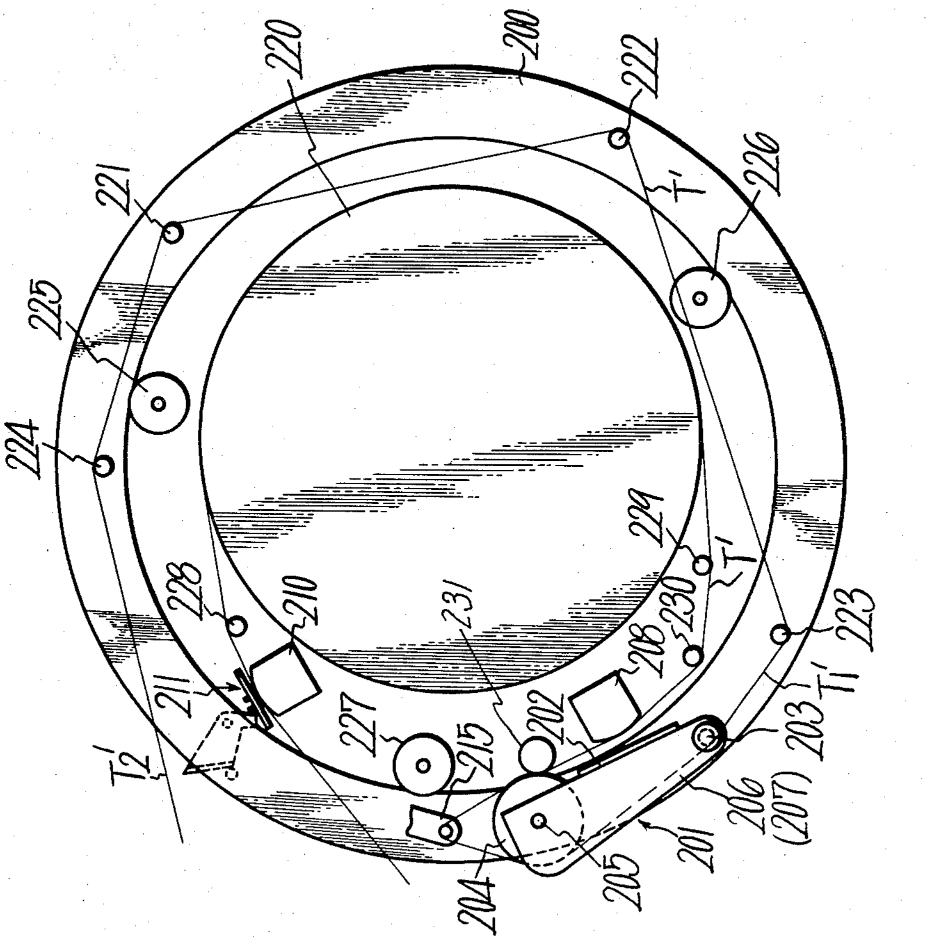
FIG. 9 is a top plan view similar to a portion of FIG. 2, but showing a modified magnetic shielding assembly.

FIG. 9 illustrates a modified form of the present invention that has a tape guide drum 220, tape guide pins 221–224 mounted on a ring 200, guide rollers 225–227 for the ring 200, tape guide members 228–230 mounted on the chassis, and a capstan 231. In the present example, the tape guide mechanism is substantially the same as that employed in the foregoing example, and hence is not illustrated. In this embodiment, however, a shield plate 202 is mounted on a pinch roller assembly 201 pivoted to the ring 200. The pinch roller assembly shown in FIG. 10 consists of a pivot pin 203 carried by the ring 200, a pair of plates 206 and 207 pivoted at one end to the pivot pin 203, and a pinch roller 204 rotatably supported by the plates 206 and 207 about a pivot pin 205. The shield plate 202 is fixed, for example, by spot welding, to the plates 206 and 207 on the side facing toward a first stationary magnetic head 208 for recording and reproducing audio and control signals. Accordingly, when the magnetic tape T′ is loaded by a tape engaging member 215 at a predetermined position, an undesirable magnetic flux emanating from the first stationary head 208 is shielded by the shield plate 202 to obviate any adverse effect due to magnetic flux on the magnetic tape $T_1'$ extending between the tape engaging member 215 and the tape guide pin 223.

The combination of the shield plate 202 with the pinch roller assembly 201 carried by the ring 200 is of particular utility when employed in cassette-type magnetic recording and reproducing apparatus in which the stationary head 208 is disposed near the ring 200. Further, in the present example a second stationary magnetic head 210 is provided for erasing signals recorded on the tape T′ and a shield plate assembly 211, which is identical to that depicted in FIGS. 7 and 8, is disposed in front of the stationary head 210. Since the shield plate assembly 211 is exactly the same as that employed in the foregoing example, no description will be given. The reason why the tape $T_2'$ is disposed near the second stationary head 210 is that the cassette opening is not so large.

Figure 12:
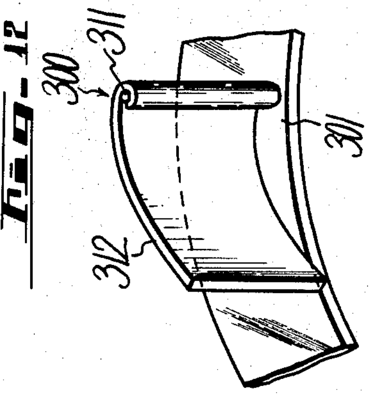
FIG. 12 is a perspective view of the shielding assembly illustrated in FIG. 11.
Figure 11:
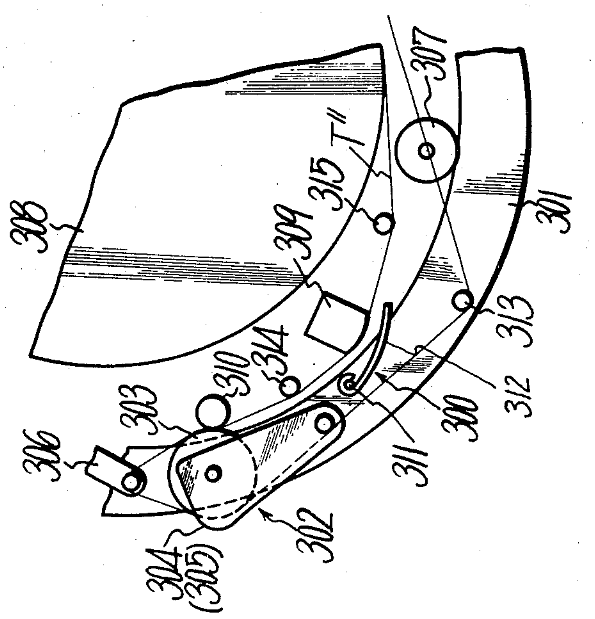
FIG. 11 is a top plan view, similar to FIG. 9, but showing still another magnetic shielding assembly.

FIG. 11 shows another embodiment of this invention. A shield plate assembly 300 is carried by a ring 301 identical in construction with those employed in the foregoing examples. In the present example, the shield plate assembly 300 consists of a post 311 fixed on the ring 301 and a shield plate 312 affixed at one end to the post 311 and curved inwardly at the other end toward a drum 308 as shown in in FIG. 12. The shield plate 212 is formed of permalloy, as is the case with the foregoing examples. Of course, the shield plate assembly 300 is disposed on the ring 301 in such a spaced relation to the pinch roller assembly 302 that the shield plate 312 lies in front of a stationary magnetic head 309 when the ring 301 is turned through a predetermined angle, that is, when a magnetic tape T″ is wrapped about the periphery of the drum 308 to a predetermined extent. The embodiment in FIG. 11 includes a pinch roller 303, upper and lower plates 304 and 305 of the pinch roller 303, a tape engaging member 306, a tape guide pin 313 carried by the ring 301, a capstan 310, and tape guide pins 314 and 315 mounted on the chassis (not shown).

With the present invention, the shield plate can be operated accurately at a predetermined time by an extremely simple mechanism and, further, the shield plate assembly is compact and requires very few parts. Hence, it is of great utility in practice.

What is claimed is:

1. Magnetic tape apparatus comprising a tape guide drum having at least one associated rotary magnetic head movable in a circular path substantially coinciding with the periphery of said drum, movable tape guide means engageable with a magnetic tape between supply and take-up reels on which the tape is wound and being operable to withdraw said tape from said reels and to dispose the withdrawn tape in a path having a first section along a part of which the tape is wrapped about at least a portion of said periphery of the drum for the recording and reproducing of an information signal in the tape by said rotary head and a second return section that extends substantially along said first section and is spaced from the latter, at least one stationary magnetic head positioned alongside one of said first and second sections of the tape path and emitting magnetic flux to act on the tape in said one path section, shielding means movable from a normal inoperative position to an operative position in response to operation of said tape guide means, said shielding means, in said inoperative position thereof, being spaced from said path at the location of said stationary head to avoid interference with the disposition of the tape in said path by operation of said tape guide means, and said shielding means, in said operative position thereof, being interposed between said stationary magnetic head and the other of said tape path sections for shielding the tape in said other path section from said magnetic flux emitted by said stationary head.

2. The magnetic tape apparatus as claimed in claim 1, wherein said tape guide means comprises:

A. At least one tape engaging member for drawing said magnetic tape from said supply and take-up reels; and B. A ring-like supporter revolving around said tape guide drum, said shielding means being shifted from said inoperative position to said operative position by said ring-like supporter.

3. The magnetic tape apparatus as claimed in claim 2, wherein said shielding means comprises:

A. A movable plate positioned in front of said stationary magnetic head; and

B. Biasing means for moving said movable plate away from the front of said stationary magnetic head, said movable plate being held in front of said stationary magnetic head by the supporter of said tape guide means against said biasing means.

4. The magnetic tape apparatus as claimed in claim 1, wherein said shielding means comprises:

A. A shield plate pivotally mounted in front of said stationary magnetic head;

B. First biasing means for retaining said shield plate in opposing relation to said stationary magnetic head; and C. Second biasing means having a greater force than said first biasing force for pulling said shield plate away from said stationary magnetic head, said shield plate being brought by said first biasing means to the front of said stationary magnetic head in response to the turning of said tape guide means against the force of said second biasing means.

5. The magnetic tape apparatus as claimed in claim 4, wherein said tape guide means comprises:

A. At least one tape engaging member for drawing said magnetic tape from said supply and take-up reel;

B. A supporter carrying said tape engaging member and turning around said tape guide drum; and C. A pin mounted on said supporter for controlling said second biasing means.

6. The magnetic tape apparatus as claimed in claim 1, wherein said shielding means is carried by said tape guide means, and said tape guide means comprises:

A. At least one tape engaging member for drawing said magnetic tape from said supply and take-up reels; and B. A supporter carrying said tape engaging member and revolving around said tape guide drum.

7. The magnetic tape apparatus as claimed in claim 6, wherein said shielding means is a sheet of magnetic material.

8. The magnetic tape apparatus as claimed in claim 6, wherein the supporter of said tape guide means further includes means for driving said magnetic tape, said shielding means being carried by said driving means.

9. The magnetic tape apparatus as claimed in claim 1, wherein said stationary magnetic head records and reproduces an audio signal on said magnetic tape.

10. The magnetic tape apparatus as claimed in claim 1, wherein said stationary magnetic head records and reproduces a control signal on said magnetic tape.

11. The magnetic tape apparatus as claimed in claim 1, wherein said stationary magnetic head erases a signal recorded on said magnetic tape.

12. Magnetic tape apparatus comprising a tape guide drum having at least one associated rotary magnetic head movable in a circular path substantially coinciding with the periphery of said drum, movable tape guide means engageable with a magnetic tape between supply and take-up reels on which the tape is wound and being operable to withdraw said tape from the reels and to dispose the withdrawn tape in a path having a first section along a part of which the tape is wrapped about at least a portion of said periphery of the drum for the recording and reproducing of an information signal in the tape by said rotary head and a second return section that extends substantially along said first section and is spaced from the latter, first and second stationary magnetic heads each positioned alongside one of said first and second sections of the tape path and emitting magnetic flux to act on the tape in said one path section adjacent each of said stationary magnetic heads, first and second shielding means respectively associated with said first and second stationary heads and being jointly movable from respective normal inoperative positions to respective operative positions in response to operation of said tape guide means, each of said first and second shielding means, in said inoperative position thereof, being spaced from said path at the location of the respective stationary head to avoid interference with the disposition of the tape in said path by the operation of said tape guide means, and each of said first and second shielding means, in said operative position thereof, being interposed between the respective stationary head and the other of said tape path sections for shielding the tape in said other path section from the magnetic flux emitted by said first and second stationary heads.

13. The magnetic tape apparatus as claimed in claim 12, wherein said first shielding means comprises:

A. A plate pivotally mounted in front of said first stationary magnetic head; and B. Biasing means for pulling said plate away from the front of said first stationary magnetic head, said plate being brought by said tape guide means to the front of said first stationary magnetic head against said biasing means.

14. The magnetic tape apparatus as claimed in claim 12, wherein said second shielding means is carried by said tape guide means, and said tape guide means comprises:

A. At least one tape engaging member for drawing said magnetic tape from said supply and take-up reels; and B. A supporter carrying said tape engaging member and turning around said tape guide drum, said second shielding means being brought to the front of said second stationary magnetic head when said supporter is brought to a predetermined position.

* * * * *